United States Patent [19]

Kueng et al.

[11] Patent Number: 4,853,686

[45] Date of Patent: Aug. 1, 1989

[54] METHOD AND APPARATUS FOR ESTABLISHING A CONNECTION IN SHORTWAVE RADIO NETWORKS

[75] Inventors: Roland Kueng, Hombrechtikon; Hanspeter Widmer, Zurich, both of Switzerland

[73] Assignee: Zellweger Tellecommunications Ltd., Hombrechtikon, Switzerland

[21] Appl. No.: 44,104

[22] Filed: Apr. 29, 1987

[30] Foreign Application Priority Data

Apr. 30, 1986 [CH] Switzerland ............... 01773/68

[51] Int. Cl.$^4$ ............................................. H04Q 1/00
[52] U.S. Cl. ...................... 340/825.210; 340/825.520; 340/825.580; 370/100; 375/111; 455/51
[58] Field of Search ............. 340/825.52, 825.58, 340/825.2, 825.21, 825.73; 375/50, 77, 91, 100, 111, 113; 370/100; 455/32, 51, 52, 47, 203, 206

[56] References Cited

U.S. PATENT DOCUMENTS

| | | | |
|---|---|---|---|
| 3,955,142 | 5/1976 | Frank et al. | 455/32 |
| 4,011,511 | 3/1977 | Chang | 375/91 |
| 4,217,661 | 8/1980 | Kahn | 455/47 |
| 4,555,806 | 11/1985 | Lange et al. | 455/62 |
| 4,606,040 | 8/1986 | David et al. | 455/32 |
| 4,616,364 | 10/1986 | Lee | 375/40 |
| 4,628,517 | 12/1986 | Schwarz et al. | 455/59 |

FOREIGN PATENT DOCUMENTS 3211325 of 0000 Fed. Rep. of Germany.

OTHER PUBLICATIONS

"Assessing HF Propagation Conditions in Real Time", Defense Electronics Beach, May 1980.

*Primary Examiner*—Ulysses Weldon
*Attorney, Agent, or Firm*—Burns, Doane, Swecker & Mathis

[57] ABSTRACT

A connection (link setup) between individual stations of a radio network may be carried out fully automatically, and even with poor transmission quality, only the wanted stations are activated. A call signal includes a synchronization signal having narrow band, mark and space signals which form the component signals of a diverse pair of signals. A synchronization signal receiver independently detects and evaluates both of the component signals of the diverse pair as well as comparing the results thereof, with means of digital signal processing.

35 Claims, 5 Drawing Sheets

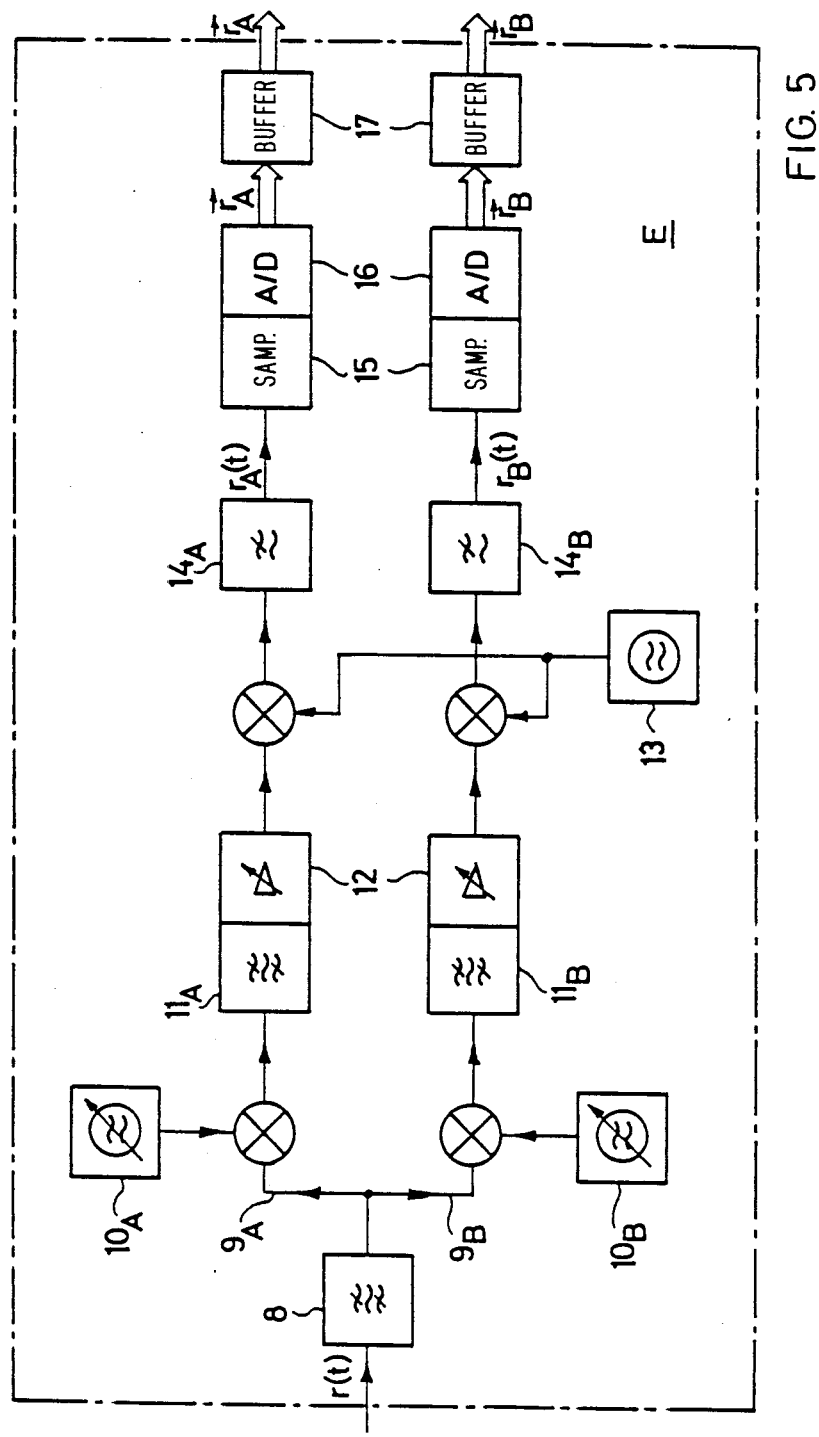

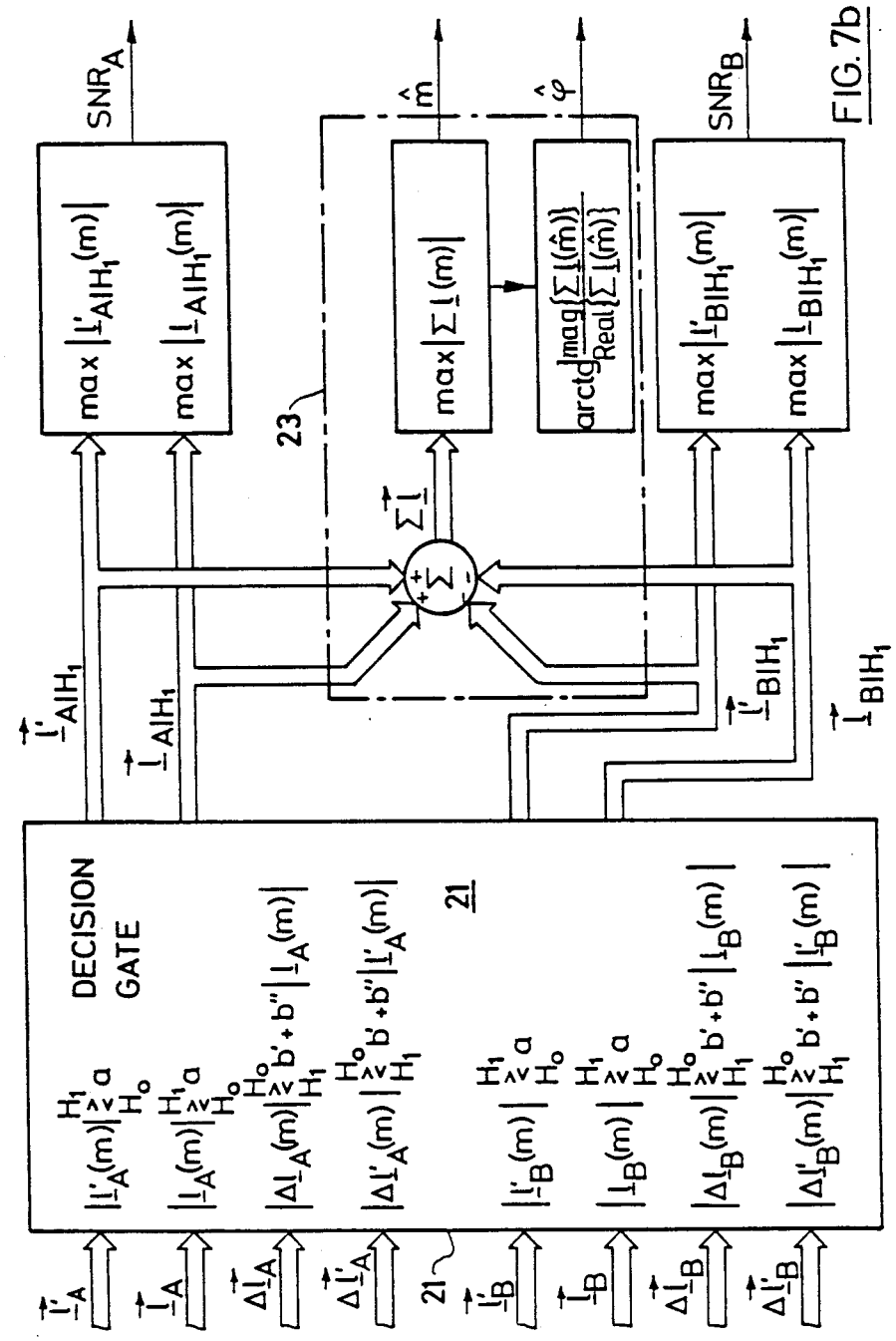

METHOD AND APPARATUS FOR ESTABLISHING A CONNECTION IN SHORTWAVE RADIO NETWORKS

BACKGROUND OF THE INVENTION

The invention relates to a method and apparatus for establishing a connection link set up in shortwave radio networks having several stations with one transmitter and/or one receiver, by means of a call signal sent out from a transmitter and including a synchronization signal and an address signal.

Shortwave connections primarily use the spread of skywaves which are reflected at the ionosphere in order to realize the transmission of news over great distances. In spite of the insufficiencies of the transmission channel for a skywave connection, such as noise-like channel interferences, time-variant, dispersive channel behavior and the presence of selective sources of interference, this means of transmission has recently enjoyed a considerable increase in importance thanks to new microprocessor techniques and, by comparison with satellites, low cost.

Special problems occur during establishing of the connection because there is always a greater or smaller frequency difference (offset) between transmitter and receiver frequencies and because no time synchronization is given before the connection between transmitter and receiver is taken up.

Transmissions usually result in the economic use of the frequency band by means of single side band technology, in which at the transmitter end, a frequency translation of the signal is undertaken out of the acoustic frequency (300 Hz to 3.4 KHz) into a chosen high frequency band and the reverse operation is carried out by the high frequency receiver. The received signal is passed on in the low frequency region to demodulator and decoder circuits. The high frequency receivers dispose of automatic gain control, in which the total power or voltage within the chosen receiving channel band width constitutes the steering signal. In the process, depending on the spectral covering of desired and interfering signals, noise and desired levels varying between broad limits appear at the output.

In a selective call network various stations are to be activated either individually or with a collective word. The selective call transmitters and receivers of the individual stations are accommodated in their modulator or demodulator block. The call signals are composed of a group of suitable amplitude-time-functions, which can be recognized in the channel noise and distinguished from one another by the individual receivers. Even in transmissions of low quality, on the one hand, unwanted stations should never be activated and, on the other hand, the wanted stations should always be activated.

Pilot tone transmissions usually are not capable of fulfilling these requirements because the probability of faulty synchronization increases with the presence of certain interferences.

It is known how to use a relatively costly equipement system in addition to the transmitter-receiver parts of the stations, with which it may be determined which channel is free and undisturbed by neighboring transmitters, and what are the momentary spreading conditions over the ionosphere (see for example, Frequency Management System, Defense Electronics, May 1980, pp. 21, 22). However the fully automatic establishing of a shortwave connection is not possible with this system.

In the case of intended interferers (ECM), a prior analysis is only of little use, as in every case the channel in use is immediately jammed.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

OBJECTS AND SUMMARY OF THE INVENTION

The object of the invention is to provide a method and apparatus for establishing shortwave connections between the stations of a radio network to be carried out fully automatically, and where, even in transmissions of poor quality, only the wanted stations are activated.

This object is realized according to the invention by using a remarkable synchronization signal adapted to the transmission channel, the synchronization signal including narrow band mark and space signals which form the component-signals of a diversity pair.

In one aspect of the invention, this is accomplished by providing a synchronization signal having the advantage that it allows a bit synchronization between the stations simultaneously with the determination of the frequency offset, in that the phase of the modulation signal modulating the carrier signal is determined at the place of reception. The modulation signal is recovered in a mathematically exact manner, as the expected signal is known. By this means, an increase in the probability of faulty synchronization caused by the presence of certain interferences is largely avoidable. The creation of the synchronization signal out of narrow band, mark and space signals which form the component-signals of a diverse pair, opens up the possibility of a separate detection of these component-signals, which increases the reliability of the link establishement quite considerably. The probability that an interfering source is present and striking the component signals simultaneously in both diversity channels, is equal to zero. A center frequency error of a few hertz between the source of interference and the marker signal is not critical, as 500 subchannels each of 1 Hz are investigated in the region between 250 and 750 Hz by means of a special operation of signal processing.

The invention relates further to a device for carrying out the procedure mentioned, with a synchronization signal receiver.

The device according to the invention is characterized in that the synchronization signal receiver has means for the independent detection and evaluation of both of the component-signals of the diverse pair, as well as means for comparing the results gained thereby.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING

FIG. 5 is a schematic view illustrating an embodiment of the input part of a synchronization signal receiver according to the invention;

FIGS. 7a, 7b are schematic views, illustrating the numerical signal processing of a synchronization signal receiver according to the invention.

DESCRIPTION OF THE PREFERRED EMBODIMENT

Figure 1:
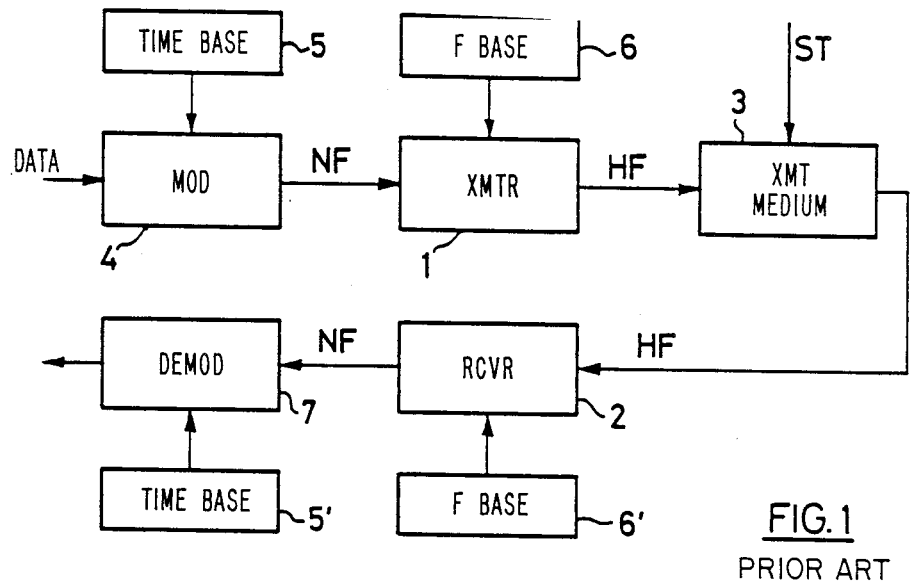
FIG. 1 is a diagrammatic view illustrating a prior art shortwave connection with a transmitter and receiver.

According to FIG. 1, a customary shortwave connection used today includes a transmitter 1 and a receiver 2 between which signals are transmitted through a transmission medium 3. The transmitter-side data input goes into a modulator/coder circuit 4, to which a time base 5 is assigned. The output signal of the modulator/coder circuit 4 is a normal or low frequency signal (NF) in the acoustic frequency band between 300 Hz and 3.4 KHz. With this low frequency signal, a frequency translation into a chosen high frequency band is carried out by means of transmitter 1, which is a high frequency (SSB) transmitter. A frequency base 6 is assigned to transmitter 1 in the region of the high frequency band. The high frequency output signal (HF) of transmitter 1 sent out into the time-variant transmission medium 3 lies, for example, in the region between 3 and 30 MHz. In the transmission medium 3, an additive interference noise (ST) is added to the high frequency signal.

In the high frequency (SSB) receiver 2, to which a high frequency base 6' is assigned, the high frequency signal is transformed into a low frequency signal in the transmission-side acoustic frequency band and supplied to a demodulator/decoder circuit 7, to which a time base 5' is assigned. The data output occurs at the output of the demodulator/decoder circuit 7.

If a shortwave radio network forms a so-called selective call network, then there are a number of different stations present which can be activated individually or with a collective call. To that end, each of the stations involved disposes of a selective call transmitter and receiver, which are both housed in the modulator and demodulator block 4 and 7, respectively, in the arrangement of FIG. 1 (see for example, German Patent DE-PS. No. 32.11.325). The signals for calling, the so-called call signals, are composed of a group of suitable amplitude time functions, which can be discerned from the channel noise and distinguished from one another by the individual receivers.

Figure 2:
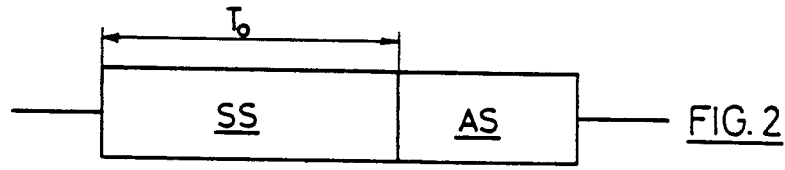
FIG. 2 is a diagrammatic view illustrating a representation of a call signal according to the invention.
Figure 4:
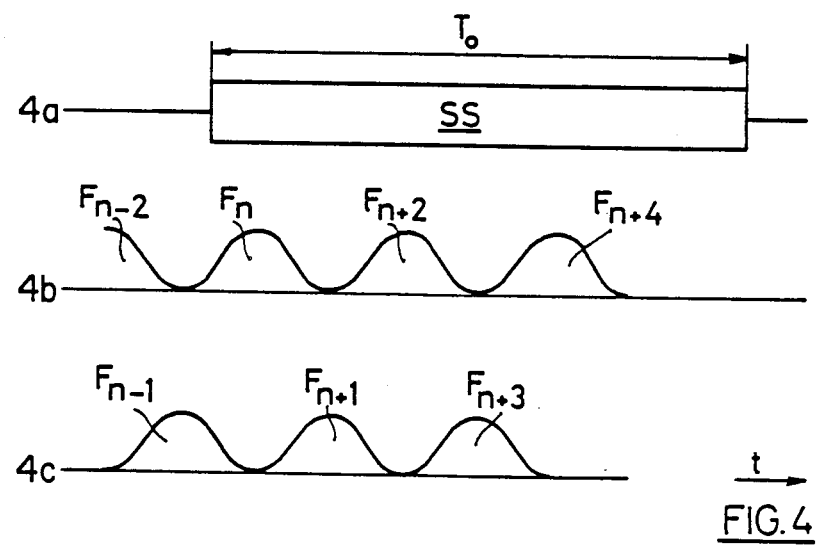
FIGS. 4a, 4b, 4c are diagrammatic views illustrating observation intervals according to the invention.

In FIG. 2 a call signal used according to the method of the invention is diagrammatically illustrated and includes a synchronization signal (SS) and an address signal (AS). At any one time, the receiver observes time intervals of length T and decides whether a synchronization signal (SS) is present or not within the respective interval. The observation intervals are weighted by a window function (FIG. 4). A duration of 2 seconds is preferably reserved for the synchronization signal (SS).

In the original, desynchronous state, at least one observation interval overlaps completely with the transmitter signal and T must be no more than 4/3 seconds. The length T of the observation interval is only purposefully chosen if it is shorter than the coherence time $T_C$ of the signal received. With the window time chosen, $T_C$ should be $>T/2$. Further criteria such as the broadening of the spectral components of the synchronization signal SS by phase variations on the transmission channel, and the frequency drift between transmitter and receiver stations, which both diminish the observation time, have led to a length of the observation interval of $T=1$ second.

In the method according to the invention, the receiver does not know the exact carrier frequency of the transmitter, yet there is a domain of expectation in which, with very high probability, a call signal will appear. This domain of expectation can, depending on the technology of transmitter and receiver, cover up to 500 Hz and, in the example described, is $\pm 234$ Hz. Within this region, a call signal is to be perfectly detectable and, depending on the signal/noise ratio, its frequency offset should be estimated better than $\pm 1$ Hz. A reliable detection should be possible for a signal/noise ratio of down to at least $-24$ dB in a 2 KHz band width.

Because of the large domain of expectation, very narrow filters for the filtering of the wanted signal from the noise can not be used. In particular, strong, selective interfering sources prevent a determination of the exact frequency offset by means of conventional analog technology. For that reason a remarkable signal is chosen for the synchronization signal SS, which is adapted to the transmission channel and easily detected in spectral environments with a lot of interference.

Figure 3:
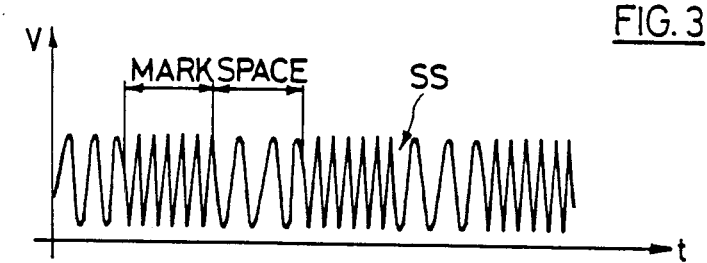
FIG. 3 is a diagrammatic view illustrating a representation of a synchronization signal according to the invention.

In FIG. 3 the synchronization signal used in the method according to the invention is represented, where the amplitude v is entered on the ordinate of the diagram and the time t is entered on the abscissa. This synchronization signal sent out during the time period $T_O$ is a low frequency carrier signal, which is frequency modulated with a square wave function also known as an FSK signal. According to the presentation it consists of "mark" and "space" signals.

The synchronization signal SS makes possible a bit synchronization between the stations simultaneously with the determination of the frequency offset, in that the phase of the modulation signal is determined at the place of reception. At the transmitter-side the modulation frequency is previously given with quartz accuracy and is known to the receiver. The phase should be determinable to at least 0.5 rad.

The mark and space signals, each being an AM signal, are narrow band, in order to effect an identically shaped variation of the most intensive spectral parts with selective fading. The frequency difference between them is chosen to be as large as possible in order to obtain two signals decorrelated with respect to selective fading, yet both lie within the same channel. The keying frequency is distinctly greater than the fading frequency and running time differences should be of little consequence.

Because of these conditions and considerations, a modulation frequency of 16 Hz, a base band carrier of around 2 KHz for the mark signal, and for the space signal, a base band carrier of around 500 Hz are chosen. Yet both carriers are variable, in order to make possible adaptive frequency shifts of the AM signals.

Mark and space signals are viewed by the receiver as an AM diversity pair and detected separately. This has the additional advantage that the dependability of the detection increases strongly with unequal interference signal distribution over the channel. The total signal has constant power (no ASK, AM part), makes possible a non-linear amplifier technology and an optimal exploitation of the transmitter power amplifier and is, in addition, distinctly distinguishable from selective interference signals.

If the high frequency receiver is on automatic scan operation, for example SELSCAN (a registered trade mark of Rockwell-Collins), it periodically investigates a determined number of programmed channels upon a synchronization signal is present. This is sent out by the transmitter for as long as a scan cycle lasts. After successful detection of a synchronization signal the receiver stops the scan operation and waits for the address signal AS (FIG. 2).

As already mentioned, the receiver observes time intervals of length T and decides whether a synchronization signal is present within the relevant interval. Here, the observation intervals are weighted by a window function. In FIG. 4a, a synchronization signal SS of length $T_O$ is represented, the windows of the observation intervals are represented in FIGS. 4b and 4c (not in proportion), the even-numbered windows $F_{n-2}$, $F_n$, $F_{n+2}$, etc. in FIG. 4b, and the uneven windows $F_{n-1}$, $F_{n+1}$, etc. in FIG. 4c.

As may be seen from a comparison of FIGS. 4b and 4c, the individual intervals overlap for half the time, in order to provide continuous observation over the time access t. The length T of an observation interval is 1 second and is determined by the length $T_O$ of the synchronization signal SS and by the coherence time $T_C$ of the channel.

Figure 7A:
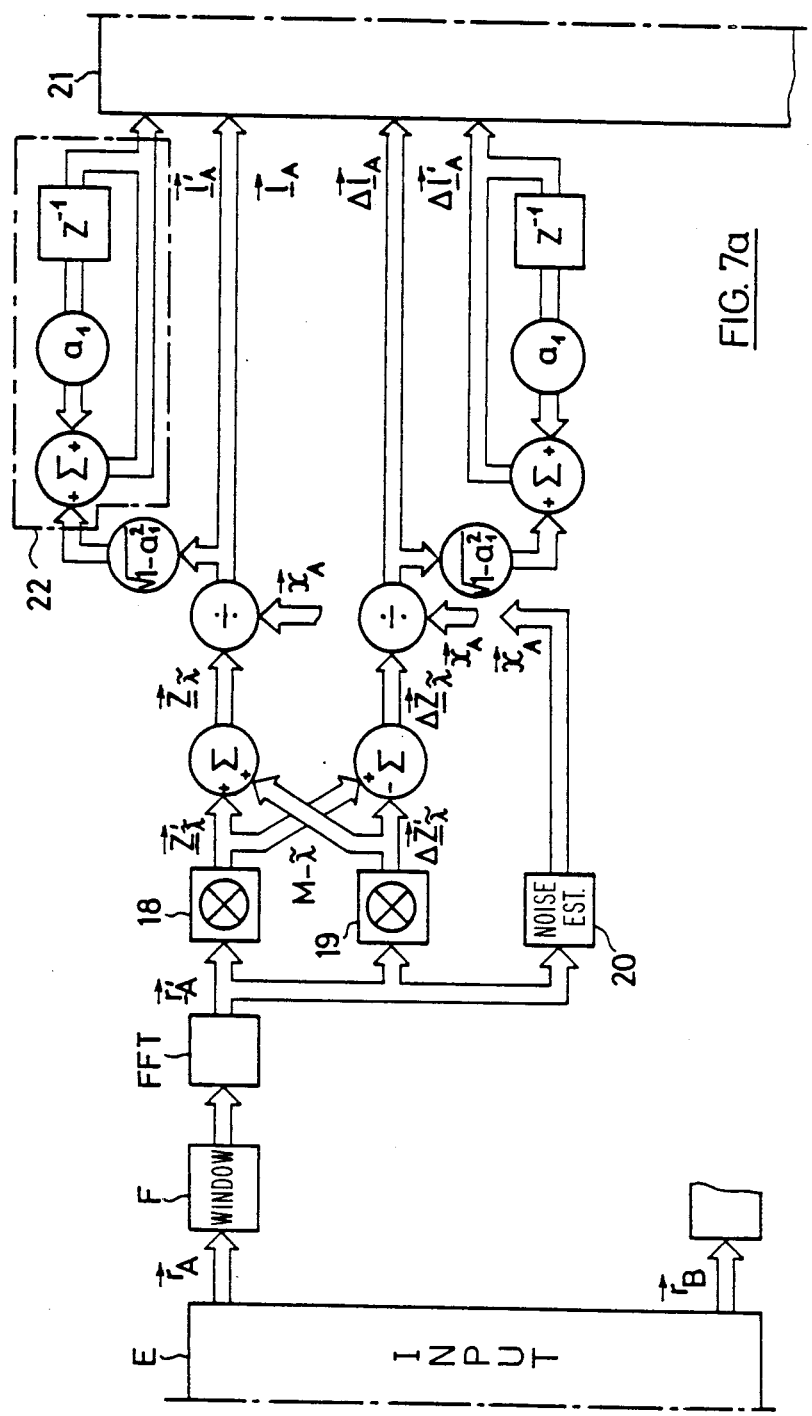

Detection values of two overlapping observation intervals are practically statistically independent on account of the window function, so that during a period $T_O$ of emission of the synchronization signal SS, roughly $2T_O/T$ detection values will be taken. In addition, the suitable choice of the window function makes possible a high dynamic ratio in the spectral domain after a fast Fourier transformation FFT is carried out (FIG. 7A).

Of course an increase in the probability of detection would result from an increase in the length of emission of the synchronization signal SS.

A considerably greater additional advantage results from averaging the detection values over several observation intervals. Thereby, the receiver continually accumulates detection values in a "lossy integrator" or in a digital low-pass filter. In this integrator the required components crystalize out of the stochastic components piece-by-piece as in a puzzle, so that up to a certain usable integration period an increasingly sharpening picture of the synchronization signal emerges, from which the carrier frequency as well as the phase angle may be determined.

The minimal signal/noise ratio for a successful detection and synchronization can thereby be lowered, within certain limits, depending on the length of emission of the synchronization signal, down to about $-24$ dB at 2 KHz noise band width.

After emission of the synchronization signal SS and its detection, all the selective call receivers on the same call channel are synchronized. Immediately after the synchronization signal SS follows an address signal AS, which determines the actual receiver to be selected. After successful detection of the address signal, the word synchronization, that is the complete time synchronization between transmitter and receiver, is also produced.

The receiver carries out two independent detections and evaluations of both of the component-signals of the diverse pair and subsequently compares the results. After preliminary analog processing (filtering and mixing), the two additively disturbed receiving signals are transformed by an A/D converter into a sequence of N numerical values during each period of observation T. In this connection, it is pointed out that by "receiver" is meant a demodulator/decoder in a low (NF) frequency region (of demodulator/decoder 7 in FIG. 1).

In FIG. 5, the input part E of the synchronization signal receiver carrying out the analog processing is represented. The received signal r(t) is first led through a total channel filter 8 with a pass band region of 300 Hz to 3.4 KHz at whose output, two paths $9_A$ and $9_B$, for both of the component-signals of the diverse pair, are connected. By means of a first mixer $10_A$ or $10_B$, the signals in each path are translated up into the same reception band A or B by a variable oscillator (FIG. 6) and subsequently filtered by an intermediate frequency (IF) filter $11_A$, $11_B$ whose transmission curve lies at around 4.5 KHz. In this way spectral overlaps during this preselection of the signals, and hence in the best possible manner, an overloading of the receiver as well as the "aliasing" effect (scanning frequency lower than twice the highest signal frequency) in the digital signal processing section, are avoided.

An AGC amplifier 12 is connected to each IF filter $11_A$, $11_B$. In order to keep the scanning rate as low as possible, in each part $9_A$, $9_B$, both of the frequency regions of 500 Hz band width are translated down by a second mixer 13 into the base band of 250 Hz to 750 Hz that is used as a fixed processing band. Afterwards, there follows a filtering by an image frequency filter $14_A$, $14_B$ for the purpose of damping. The output signal $r_A(t)$ and $r_B(t)$ of the image frequency filter $14_A$ or $14_B$, respectively, arrives at a sampler 15 with an A/D converter 16, at whose output a signal vector $\vec{r_A}$ or $\vec{r_B}$ results.

The signal vectors $\vec{r_A}$ and $\vec{r_B}$ each have N values, which first of all arrive in a buffer store, from where they can be called out by a signal processor. The buffer store 17 includes 3 part-stores of size N/2; one part is at the disposal of the A/D converter 16, and two parts are at the disposal of the processor for processing.

Figure 6:
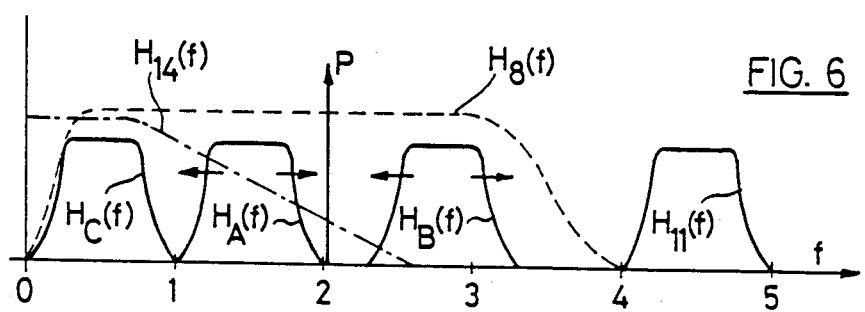
FIG. 6 is a diagrammatic view illustrating the frequency composition of the individual filters of the input part of FIG. 5.

The frequency composition through the different filters of the input part E (FIG. 5) is represented in FIG. 6, where the frequency f is given in KHz on the abscissa. The characteristic curve $H_8(f)$, illustrated in a broken line, corresponds to the transmission characteristic of the total channel filter 8, the dotted-broken line characteristic curve $H_{14}(f)$ corresponds to those of the image frequency filter $14_A$, $14_B$, and the arrow P represents the sampling signal. The sampling signal is represented as being of 2,048 KHz. The characteristic curve $H_C(f)$ represents the fixed processing band (base band of 250 to 7450 Hz), the characteristic line $H_A(f)$, the variable receiving band for the one component-signal (path $9_A$, FIG. 5) and the characteristic curve $H_B(f)$, the variable receiving band for the other component-signal (path $9_B$, FIG. 5) of the diverse pair. $H_{11}(f)$ is the transmission curve of the intermediate frequency filter $11_A$, $11_B$ (FIG. 5).

Subsequent to the analog processing represented in FIG. 5 there follows the numerical signal processing of the synchronization signal receiver, which is represented in a block diagram in FIG. 7. This block diagram shows the individual functional steps of the signal processing as it is carried out by the corresponding part of the synchronization receiver formed by means of a signal processor. In connection with FIG. 7 only one half of the diversity receiver (signal vector $\vec{r}_A$) is illustrated since the device is symmetrical. The same signal processing occurs with the second signal vector ($r_B$) as with the first ($r_A$), but with different number values. FIG. 7 is split into two FIGS., 7a and 7b, for reasons of accessibility to view. FIG. 7a shows the signal processing up to the so-called hypothesis decision, and FIG. 7b shows the remaining functional steps. The result of the signal processor according to the numerical signal processing contains the chosen hypothesis, whether a synchronization signal is present ($H_1$) or not ($H_O$). In the case of it being present ($H_1$), an estimate of the frequency offset and the phase of both signals $\vec{r}_A$ and $\vec{r}_B$ for the values of their signal/noise ratio, are given. By means of the numerical signal processing, which is carried out in real time, it is essentially tested to determine whether the receiving vector $\vec{r}$ of the N-dimensional vector space TR lies in the decision region of hypothesis $H_1$ or $H_O$. The decision region has the shape of an N-dimensional cone whose tip is in the origin of TR. The amount $\vec{r}$ (or the total power of the receiving signal) does not influence this decision. The hypothesis value is based on the direction of $\vec{r}$. The decision region is thus an N-dimensional space angle region. The investigation of $\vec{r}$ in relation to its decision region occurs by means of the calculating algorithms described as follows in connection with FIG. 7, which represent linear and non-linear coordinate transformations.

The first calculating operation, to which the N values of the signal vector $\vec{r}_A$ (and also $\vec{r}_B$, which however, is not represented, as already mentioned), is the weighing by a window function F, following which is a Fourier transformation. The latter depicts the vector $\vec{r}$ of TR in $\vec{r}'$ of TR'. The Fourier transformation used is a so-called fast Fourier transformation FFT, the arithmetically faster version of the discrete transformation. As the synchronization signal is periodic in nature, the transition into the frequency region $\vec{r}'$ undergoes a separation into actual signal and noise components. This separation in the manner of a filtering is getting better with a higher spectral resolution of the Fourier transformation. The resolution for its part is determined by the observation period T or the "size" of the FFT.

With T=1 second, and a scanning frequency $f_r$ of 2,048 KHz or N=2,048, a spectral resolution of 1 Hz results in principle though upon insertion of a window function F a broadening of the main peak to 2 Hz and a correlation of neighboring spectral values in the noise spectrum occurs. The fine resolution, however, results in sufficient uncorrelated calculation values between the carrier and the 16 Hz side lines of the AM-modulated signal in order to determine the noise level. The separation of signal and noise now allows the search for a synchronization signal presence, whose localization is in the frequency region between 250 and 750 Hz and the determination of the modulation phase angle.

The part of the signal processing following the Fourier transformation FFT serves for the demodulation (identification) of the diverse pair, the noise estimation, a signal integration (accumulation) for wanted signals that are hard to detect, and for the hypothesis decision.

All these parts of the signal processing are of course solved as numerical operations in the signal processor.

In the spectrum previously calculated, a special demodulation adapted to the marker signal is now undertaken, in which as many characteristic distinguishing marks as possible are determined. In the embodiment represented a kind of synchronous AM-demodulation is carried out for a modulation frequency $\lambda = 16$ Hz, for every possible spectral signal position m, and when M=number of values m, for roughly M=500 Values. The demodulation occurs in the frequency domain. The method used is characterized as a Frequency-Auto-Correlation function:

$$\lambda = 16 \text{ Hz } \Gamma(\lambda) = \int_{-\infty}^{\infty} s(f) S^*(f - \lambda) df + \int_{-\infty}^{\infty} S^*(f) S(f + \lambda) df$$

Here, $S(f+\lambda)$ is the upper sideband, $S(f-\lambda)$ is the lower sideband and $S(f)$ is the carrier, $S^*$ is in each case the complex conjugate value.

The numerical version of the Frequency-Auto-Correlation function is as follows:

$$\Gamma_m(\widetilde{\lambda}) = \frac{1}{T} \sum_{m-f_g \cdot T}^{m+f_g \cdot T} S(m) S^*(m - \widetilde{\lambda}) + \frac{1}{T} \sum_{m-f_g \cdot T}^{m+f_g \cdot T} S^*(m) S(m + \widetilde{\lambda})$$

Here, $\widetilde{\lambda} = \lambda T = 16$ and $f_g$ is the spectral band width of the window function.

Figure 8:
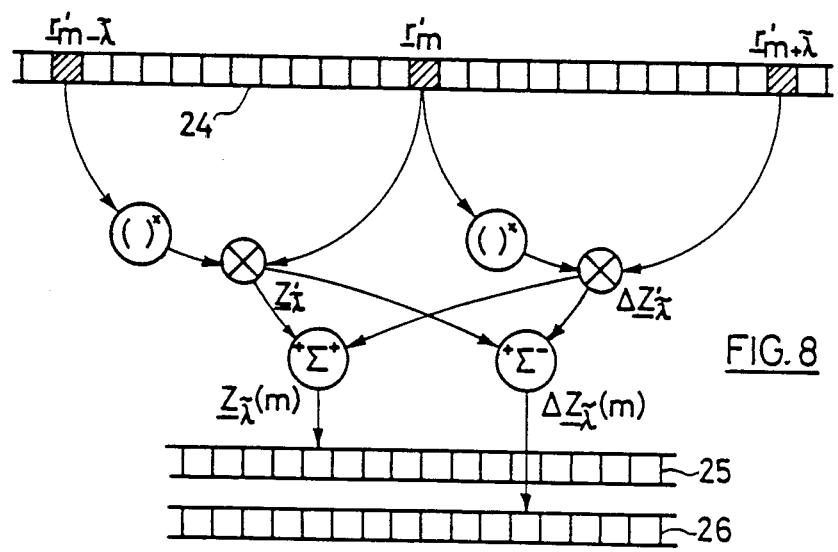
FIG. 8 is a diagrammatic view illustrating a numerical synchronization signal demodulation according to the invention.

Here, interference signals, even AM signals with a different modulation than 16 Hz produce in most cases only small signal energies, as the vectors for $S(f+\lambda)$, $S(f-\lambda)$ and $S(f)$ do not support themselves. In FIG. 7a two demodulators 18 and 19 are drawn in. In the first demodulator 18 the vector $\vec{Z}_{\widetilde{\lambda}}$ of the numerical version of the Frequency-Auto-Correlation function $\Gamma_m(\widetilde{\lambda})$ is determined and, in the second demodulator 19, the corresponding error vector $\Delta \vec{Z}_{\widetilde{\lambda}}$ is determined. There, the following characteristics of the demodulation will be taken into consideration:

The sideband lines must be at the right frequency location;

In respect of the carrier, the sideband line-signal energy must fall within a certain region of use for AM; and The vector $\vec{Z}_{\widetilde{\lambda}}$ of the numerical version of the of the Frequency-Auto-Correlation function and the corresponding error vector $\Delta \vec{Z}_{\widetilde{\lambda}}$ must lie within certain limits; $\vec{Z} \to \infty$, $\Delta \vec{Z} = 0$. would be ideal. This numerical synchronous signal demodulation is represented in FIG. 8. It will be seen that one starts out from the carrier $r'_m$ (Components of the Vector $\vec{r}'$ for $S(f)$), and from the upper and lower sidebands $r'_{m+\widetilde{\lambda}}$ and $r'_{m-\widetilde{\lambda}}$ (Components of the Vector $\vec{r}'$ for $S(f+\lambda)$ and $S(f-\lambda)$).

The values $r'_{m-\widetilde{\lambda}}$, $r'_{m+\lambda}$ and $r'_m$ are in a frequency spectral value store 24. The complex conjugate value of $r'_{m-\widetilde{\lambda}}$ and/or $r'_m$ is in each case multiplied by $r'_m$ or by $r'_{m+\widetilde{\lambda}}$ and the results of the multiplication are added and subtracted, by which means the Vector $\vec{Z}_{\widetilde{\lambda}}$ (numerical version of the Frequency-Auto-Correlation function) and the error Vector $\Delta \vec{Z}_{\widetilde{\lambda}}$ are formed. These values are deposited in the corresponding stores 25 and 26 for the numerical version of the Frequency-Auto-Correlation function or for the error Vector.

This operation is relatively simple for an AM-Signal. However, in principle, a different ideal demodulator exists for every type of modulation and for every remarkable signal. With the choice of $f_g \cdot T = 0.5$, the optimal and also simple demodulation algorithm was found. For the carrier m of the AM-signal in the chosen embodiment: $266 \leq m \leq 734$. The results of the demodulation for each frequency in the region of expectation of the signal are first stored away.

The noise estimator is indicated in FIG. 7a by the reference numeral 20. The decision about the hypothesis, whether a synchronization signal is present or not, must, as neither signal energy nor noise power are known to the receiver in advance, be judged on the basis of the signal/noise ratio. The decision threshold derives from the probability of a false alarm.

The determination of the noise (corresponds to the estimated value of the variance $\vec{Z_\lambda}$) occurs by means of the spectral values lying in the close neighborhood of $\underline{r}'_m$, $\underline{r}'_{m-\tilde{\lambda}}$ and $\underline{r}'_{m+\tilde{\lambda}}$ (FIG. 8) and in this manner delivers a local power density in the neighborhood of the synchronization signal. The support values chosen are demodulated in exactly the same way as the sidebands are demodulated in the demodulation described by means of FIG. 8, however, $\tilde{\lambda}$ is no longer equal to 16.

The noise estimation should be a combined variable $\vec{\chi}$ comprising noise energy and noise weighting in order to grasp the influence of "white" noise as well as interference signals. The detected $\vec{Z_\lambda}$ are normalized to the local noise variable $(\vec{\chi})$ for every possible frequency and these normed values $(\vec{1}, \Delta \vec{1})$ are lead into a decider 21 where for the components of $\vec{1}$ and $\Delta \vec{1}$:

$$1_m = \frac{Z_\lambda \, m}{\chi_m} \quad \Delta 1_m = \frac{\Delta Z_{\lambda m}}{\chi_m} \quad 266 \leq m \leq 734$$

In cases of very low signal/noise ratios, an accumulation in the form of digital filters is provided which uses the values $\vec{1}$ and $\Delta \vec{1}$ over several observation periods, which leads to an improvement in the signal/noise ratio. An example of such a filtering means is designated 22 in FIG. 7A. The improvement can, without difficulty be of 14 dB, using accumulation of twenty observation intervals.

Only the background noise is decisive for signal detection to which the detection threshold relates. Individual narrow lines with large power densities, in comparison to this back-ground noise, must be separated out of the noise statistic. A shield against dangerous false signals is achieved with the help of the noise weighting. In the process, false signals are signals similar to the synchronization signal with, for example, almost the same modulation frequency or shorter duration of presence.

In order to avoid the wrong evaluation of such false signals as synchronization signals, a second noise statistic is formed out of values directly neighboring the carrier for the demodulation and the sidebands $\underline{r}'_m$ or $\underline{r}'_{m+16}$, $\underline{r}'_{m-16}$ (modulation frequency equals 16 Hz) and the two noise statistics are divided, where the quotient determines which noise statistic is to be used. In general however, the combined variable $\vec{\chi}$ already mentioned, is produced.

The presently normalized test magnitudes $\underline{1}_m$, $\Delta \underline{1}_m$, $\underline{1}'_m$ and $\Delta \underline{1}'_m$, which results from N scanning values of a time function of duration T or several T's are tested in the decider 21 (Decision Gate). For every observation interval T overlapping the previous and the following interval, the magnitudes $\underline{1}_m \, \Delta \underline{1}_m$ are used initially for each frequency m ($266 \leq m \leq 734$). The interval overlap is consciously used in the fast Fourier transformation FFT in order to win back energy losses resulting from the window function F.

The first test runs:

$$|\underline{1}_m| \underset{H_0}{\overset{H_1}{\gtrless}} a \quad 266 \leq m \leq 734$$

If the outward is positive i.e. $H_1$ (=Synchronization Signal Present), then:

$$|\Delta \underline{1}_m| \underset{H_1}{\overset{H_0}{\gtrless}} b' + b'' |\underline{1}_m|$$

is tested. In this condition, with which the spectral symmetry is tested, the threshold must be dependent on the magnitude $|\underline{1}_m|$. The magnitude of threshold a of the first test is for its part of a certain function of the noise statistic. For each determinate number of noise spectral values used, an optimal threshold may be given in each case, which is stored in an RAM-table. If $\underline{1}_m$ or $\Delta \underline{1}_m$ does not fulfill the test, these vector components are set at 0. The values $\underline{1}'_m$ and $\Delta \underline{1}'_m$ are decided according to the same method.

In order to determine the signal/noise ratio magnitude $SNR_A$ (or $SNR_B$ of the other component of the diverse pair) FIG. 7b, the maximum of $|\underline{1}_m|$ and $|\underline{1}'_m|$ must be searched. The maximum is then equal to the signal/noise ratio for this channel in the neighborhood of the synchronization signal.

A so called diversity combining (FIG. 7b.) is necessary for the determination of the frequency and phase of the chosen synchronization signal with the utilization of some kind of diversity. Here, it is important that known, rigid relations between the individual signals are well defined during the synchronization signal generation. Because of the detector symmetry, with the chosen diverse pair of two AM signals, it is simply necessary to take consideration of the phase shift of the modulation signals of 16 Hz through an angle $\pi$, i.e. one forms:

$$\vec{1}_{A|H_1} - \vec{1}_{B|H_1} = \vec{1}_{A-B|H_1}$$

and $$\vec{1}'_{A|H_1} - \vec{1}'_{B|H_1} = \vec{1}'_{A-B|H_1}$$

Thus, a diversity combining 23 only then takes place if hypothesis $H_1$ was decided for in both of channels A and B. In the case of the combination, there results a gain of 3 dB for the phase for frequency estimation. Yet on shortwave channels the use of frequency diversity is already encumbered with a great gain, as one channel section is often strongly interfered with or suffers from fading.

The frequency and the phase estimation are realized by means of the sum $$\vec{1}_{A-B|H_1} + \vec{1}'_{A-B|H_1} = \Sigma \vec{1}$$

If $H_1$ is fulfilled at several places on the frequency access, then the frequency with the largest $|\Sigma 1_m|$ is chosen. $\hat{m}$ then signifies the estimated frequency position and the phase $\hat{\rho}$ is determined out of the vector component $\Sigma 1_{\hat{m}}$ in a table with arctan-values.

The synchronization signal receiver which operates according to the method described has the advantage that, due to complete software, real-time realization of the receiver, many parameters can be optimized and varied, for example, the detection sensitivity can be optimized for a previously given estimation accuracy. The main advantages of the receiver consist in the great flexibility in specification, in the aging-free realization and in achievement of a detection certainty that lies close to the maximum theoretically achievable. This is made possible by means of the operation execution represented in FIG. 7 and the digital signal processing which alone makes possible the required precision.

The signal can be extended to several transmitter channels for scan-operations without additional expenditure and micro-scan operation (division of a channel of 3 KHz width into 500 Hz channel sections) is also possible. In addition, frequency and phase, drifts can be continuously corrected. In place of the synchronization signal, a slow data transmission can appear where the now known degrees of freedom are replaced by new ones. With the hardware described, such a selective call system may be constructed and from that again a data modem for low baud rate data may be derived, in that, in place of the selective call address, data appears.

In addition, due to the great expectation region of the synchronization signal, the system described is in a position to undertake a frequency displacement beside interference signals because of its own channel measurements (i.e. passive channel analysis) adaptively at the beginning, without the receiver having to be informed or modified for scan operation. The establishing of a connection is almost always guaranteed without change of channel, i.e., without synthesizer intervention. Another kind of radio operation exploits the great signal/-jammer superiority of the invention, namely in that connections with smaller transmitter powers or "bad", antennae can be safely constructed in the same manner. For example, the hiding of ones own signal behind strong (for example, enemy) transmitters is possible as an ECCM operation. This makes impossible a quick location of position or intended interference during the construction of a radio network or during network control/network operation.

What is claimed is:

1. A method of providing a signal for establishing a connection link set up in a short wave radio network having several stations with at least one of a transmitter and a receiver, including the step of:
   sending out a call signal via a transmission channel, said call signal including a synchronization signal and an address signal, said synchronization signal including narrow band mark and space signals forming component signals of a diversity pair, the said mark and space signals being keyed on/off separated in time by a keying signal having a frequency which is a power of two supporting fast Fourier transform algorithms in the receiver.

2. The method of claim 1, wherein base band carriers for the mark and space signals are chosen independently within a frequency range of about 300 Hz to about 3400 Hz without notifying the receiver of the exact location of the said mark and space signals.

3. The method of claim 2, wherein the base band carrier for the mark signal has a frequency of about 2 kHz and for the space signal of about 500 Hz in order to obtain two decorrelated signals about selective fading, said mark and space signals lying within the same base band channel, and wherein said keying signal is an extreme narrowband signal of 16 Hz.

4. The method of claim 3, wherein said mark and space signals form a true diversity pair by said frequency values, said diversity pair having a constant amplitude waveform.

5. A method of establishing a connection in a short wave radio network having several stations with one of a transmitter and a receiver, including the steps of:
   sending out a call signal via a transmission channel, said call signal including a synchronization signal and an address signal, said synchronization signal including narrow band mark and space signals forming component signals of a diverse pair;
   investigating, via said receiver, overlapping time intervals of said synchronization signal, said time intervals being weighted by a window function;
   transforming said component signals into a sequence with a number of numerical values; and,
   numerically processing, via analog preprocessing, said component signals during each of said time intervals.

6. The method of claim 5, wherein a base band carrier for the mark and space signals is within a frequency range of from about 300 Hz to about 3400 Hz.

7. The method of claim 6, wherein said synchronization signal is modulated between said mark and space signals at a frequency of about 16 Hz.

8. The method of claim 5, wherein a base band carrier is about 2 KHz for the mark signal and about 500 Hz for the space signal.

9. The method of claim 5, wherein said numerical processing of said component signals is in a fixed processing band from about 250 Hz to about 750 Hz.

10. The method of claim 5, wherein said analog preprocessing forms a vector with a number of values corresponding to said number of numerical values.

11. The method of claim 10, including: testing whether said vector lies in a decision region of a hypothesis synchronization signal present, or a synchronization signal not present.

12. The method of claim 5, wherein said numerical processing includes fast Fourier transformation in which a separation into actual signal and noise components occurs.

13. The method of claim 12, wherein subsequent to said fast Fourier transformation, a demodulation of the diverse pair, a noise estimation and a signal integration for wanted signals that are difficult to detect occurs, and as a result, a basis is formed for a hypothesis decision.

14. The method of claim 13, wherein said wanted signals are scaled in respect of the noise such that only values depending on a signal-to-noise ratio reaches said hypothesis decision.

15. The method of claim 14, wherein the numerical processing for each of the component signals of the diverse pair occurs separately, and after the hypothesis decision, a diversity combination takes place for determining frequency and phase of said synchronization signal.

16. The method of claim 5, including:
   receiving a synchronization signal via a synchronization signal receiver having means for independent detection and evaluation for each component signal of said diverse pair and means for comparing results thereof.

17. The method of claim 16, wherein said synchronization signal receiver includes an input part in which a signal is received and separated into said component signals of said diverse pair.

18. The method of claim 17, wherein said input part includes a total channel filter connected to a path for each of the component signals.

19. The method of claim 18, wherein each of said paths include a first and second mixer, an intermediate frequency filter between said mixers and an A/D converter.

20. The method of claim 19, including:
   connecting a buffer store for the number of values of said vector to said A/D converter, said buffer store being coupled to said A/D converter and to a signal processor performing said numerical processing.

21. The method of claim 20, wherein said signal processor carries out fast Fourier transformation, demodulation of said diverse pair and a hypothesis decision to determine whether said synchronization signal is present.

22. The method of claim 20, wherein, in response to said hypothesis decision determining a signal is present, said signal processor delivers output signals for a signal-to-noise ratio of each component signal of said diverse pair.

23. The method of claim 20, wherein said signal processor is adapted for an operation diversity combination in connection with said hypothesis decision during which a frequency and phase of said synchronization signal are determined.

24. Apparatus for establishing a connection in a short wave radio network having several stations and one of a transmitter and a receiver comprising:
   means for sending out a call signal via a transmission channel, said call signal including a synchronization signal and an address signal, said synchronization signal including narrow band mark and space signals forming component signals of a diverse pair of signals;
   means included in said receiver for investigating time intervals of said synchronization signal;
   means for numerically processing said component signals during each of said time intervals;
   a synchronization signal receiver; and
   digital signal processing means in said synchronization signal receiver for independently detecting and evaluating each component signal of said diverse pair.

25. The apparatus of claim 24 including:
   analog means in said synchronization signal receiver for separating said diverse pair into said component signals.

26. The apparatus of claim 24, including:
   total channel filter means for coupling each of the component signals to a respective path.

27. The apparatus of claim 26, wherein each path includes a first and a second mixer and an intermediate frequency filter between said mixers.

28. The apparatus of claim 26, wherein each path includes an A/D converter, said A/D converter having an output signal generating N values of a vector $\vec{r}_A, \vec{r}_B$ formed for said numerical processing.

29. The apparatus of claim 28, including:
   a buffer store coupled to said A/D converter, said buffer store provided for said N values.

30. The apparatus of claim 29, including:
   a signal processor coupled to said buffer store, said signal processor carrying out fast Fourier transformation, demodulation of said diverse pair, noise estimation, and a decision for a hypothesis that a synchronization signal is present or is not present.

31. The apparatus of claim 30, wherein after the hypothesis decision indicates a signal is present, the signal processor delivers output signals for a signal/noise ratio of both component signals of the diverse pair.

32. The apparatus of claim 31, wherein the signal processor is provided for an operation diversity-combination to be undertaken in connection with the hypothesis decision during which frequency and phase of the synchronization signal are determined.

33. A method of providing a signal for establishing a connection link set up between at least two stations in a short wave radio network, each station having a transmitter and a receiver, comprising the steps of:
   sending a call signal from the transmitter of a station, the call signal including a synchronization signal and an address signal, said synchronization signal including narrow band mark and space signals forming component signals of a diversity pair; and,
   adjusting the respective frequencies of the mark and space signals independently of one another to frequency regions less influenced by interference.

34. The method of claim 33, wherein said mark and space signals are frequency shift keyed on and off by a signal having a frequency which is a power of two supporting fast Fourier transform algorithms in the receiver.

35. The method of claim 34, wherein signal for keying said mark and space signals on and off is a 16 Hz signal.

* * * * *